(12) United States Patent
Andreasson et al.

(10) Patent No.: US 12,337,724 B2
(45) Date of Patent: Jun. 24, 2025

(54) VEHICLE RETARDATION TORQUE CONTROL

(71) Applicant: VOLVO TRUCK CORPORATION, Gothenburg (SE)

(72) Inventors: Mattias Andreasson, Gothenburg (SE); Anders Vikström, Gothenburg (SE); Bincheng Jiang, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 18/471,569

(22) Filed: Sep. 21, 2023

(65) Prior Publication Data
US 2024/0100957 A1    Mar. 28, 2024

(30) Foreign Application Priority Data
Sep. 23, 2022 (SE) .................... 2251104-2

(51) Int. Cl.
*B60L 7/18* (2006.01)
*F02D 13/04* (2006.01)

(52) U.S. Cl.
CPC ............ *B60L 7/18* (2013.01); *F02D 13/04* (2013.01); *B60L 2240/12* (2013.01); *B60L 2240/26* (2013.01); *B60L 2240/423* (2013.01); *B60L 2250/26* (2013.01); *F02D 2200/1002* (2013.01); *F02D 2200/501* (2013.01); *F02D 2200/602* (2013.01)

(58) Field of Classification Search
CPC .... B60L 7/18; B60L 2240/12; B60L 2240/26; B60L 2250/26; B60L 2240/423; F02D 13/04; F02D 2200/1002; F02D 2200/501; F02D 2200/602; B60T 8/245; B60T 8/3215; B60T 8/1887; B60T 8/1708; B60T 13/586; B60T 2270/611; B60W 10/18; B60W 30/18109
USPC ......................................... 701/70
See application file for complete search history.

(56) References Cited

U.S. PATENT DOCUMENTS

| | | | |
|---|---|---|---|
| 10,103,615 B2 | 10/2018 | Lounis et al. | |
| 10,513,265 B2 | 12/2019 | Zhao et al. | |

(Continued)

FOREIGN PATENT DOCUMENTS

| | | | |
|---|---|---|---|
| EP | 2889999 A1 | 7/2015 | |
| SE | 535806 C2 | 12/2012 | |

OTHER PUBLICATIONS

Swedish Search Report in corresponding Swedish Application No. 2251104-2 mailed Jun. 1, 2023 (2 pages).

(Continued)

*Primary Examiner* — Hai H Huynh
(74) *Attorney, Agent, or Firm* — Venable LLP; Jeffri A. Kaminski

(57) ABSTRACT

A method of open loop control of a retardation torque of a vehicle is presented. The method comprises obtaining of a current vehicle acceleration indicator, obtaining of one or more current vehicle state indicators, and determining of an open loop retardation torque based on the vehicle acceleration indicator and the one or more vehicle state indicators. The method further comprises controlling of a resulting retardation torque based on the open loop retardation torque. The resulting retardation torque is applied by one or more propulsion sources of the vehicle.

20 Claims, 3 Drawing Sheets

(56) References Cited

U.S. PATENT DOCUMENTS

| | | | |
|---|---|---|---|
| 11,820,377 B2* | 11/2023 | LaBarbera | B60W 10/06 |
| 2002/0079173 A1 | 6/2002 | Suo et al. | |
| 2013/0296130 A1 | 11/2013 | Banker et al. | |
| 2021/0394721 A1* | 12/2021 | Hecker | B60T 7/042 |
| 2022/0089154 A1 | 3/2022 | Bolger et al. | |
| 2022/0176827 A1 | 6/2022 | Otanez et al. | |
| 2022/0250634 A1 | 8/2022 | Weston et al. | |

OTHER PUBLICATIONS

Peter Lingman, Thesis for The Degree of Doctor of Philosophy Integrated Brake Control Downhill Driving Strategies, Dec. 31, 2005, XP055231821, 189 pages.

Extended European Search Report dated Feb. 19, 2024 in correspondence to application No. 23198521.9, 10 pages.

* cited by examiner

VEHICLE RETARDATION TORQUE CONTROL

TECHNICAL FIELD

The disclosure relates generally to control of vehicles. In particular aspects, the disclosure relates to control of vehicle retardation torque. The disclosure may be applied to any type of vehicles but particularly to heavy-duty vehicles, such as trucks, buses, and construction equipment. Although the disclosure may be described with respect to a particular vehicle, the disclosure is not restricted to any particular vehicle.

BACKGROUND

In order to reduce cost of propelling a vehicle, modern vehicles are generally designed and optimized for energy efficiency. Vast amount of resources are spent on increasing the energy efficiency of modern vehicles, both in producing the vehicle, and driving the vehicle, but also in servicing the vehicle. The energy efficiency comes into play in substantially all aspects of modern vehicle design from the propulsion source to control of the driver's environment in the vehicle.

In addition to the research into energy efficiency, significant research is made into the driver's environment when propelling the vehicle. The driver's environment should preferably be a safe and comfortable environment. The environment is preferably such that the vehicle may be propelled by the driver without significantly increasing bodily and mental fatigue of the driver. Functions such as cruise control, (partly) autonomous driving, parking assist etc. are developed to simplify the driver's task of propelling the vehicle and also to increasing the safety of the driver and other persons or vehicles in a surrounding environment of the vehicle.

It is not unheard of that there are compromises between the driver's environment and the energy efficiency of the vehicle.

From the above it is understood that there is room for improvements.

SUMMARY

It is in view of the above considerations and others that the various aspects and examples of this disclosure have been made. The present disclosure therefor recognizes the fact that there is a need for alternatives to (e.g. improvement of) the existing art described above.

It is an object of some aspects or examples of the present disclosure to solve, mitigate, alleviate, or eliminate at least some of the above or other disadvantages.

An object of the present disclosure is to provide a new type of vehicle retardation control which is improved over prior art and which eliminates or at least mitigates the drawbacks discussed above. More specifically, an object of the invention is to provide a vehicle retardation control that is more energy efficient and that may assist in propelling a vehicle in an energy efficient manner. These objects are at least partly addressed by the technique set forth in the appended independent claims with preferred embodiments defined in the dependent claims related thereto.

In a first aspect, a method of open loop control of a retardation torque of a vehicle is presented. The method comprises obtaining a current vehicle acceleration indicator, obtaining one or more current vehicle state indicators, and determining an open loop retardation torque based on the vehicle acceleration indicator and the one or more vehicle state indicators. Obtainment of the current vehicle acceleration indicator, obtainment of the one or more current vehicle state indicators and determining of the open loop retardation torque may be performed by a processor device. The processor device may be a processor device of a computer system. The method further comprises controlling a resulting retardation torque applied by one or more propulsion sources of the vehicle based on the open loop retardation torque. Also the controlling of the resulting retardation force may be performed by the processor device.

In a second aspect, a computer system is presented. The computer system may comprise a processor device configured to perform the method of the first aspect.

In some examples, one of the one or more vehicle state indicators is an indication of a current vehicle mass, a current vehicle load, a current vehicle speed, a current vehicle inclination, a current temperature of a vehicle component or a current road friction experienced by the vehicle.

In some examples, one of the one or more vehicle state indicator is an indication of the current vehicle mass and the open loop retardation torque is determined based on the indication of the current vehicle mass weighted with a positive mass weight factor.

In some examples, one of the one or more vehicle state indicator is an indication of the current vehicle load and the open loop retardation torque is determined based on the indication of the current vehicle load weighted with a positive load weight factor.

In some examples, one of the one or more vehicle state indicator is an indication of the current vehicle inclination and the open loop retardation torque is determined based on the indication of the current vehicle inclination weighted with a negative vehicle inclination weight factor.

In some examples, one of the one or more vehicle state indicator is the indication of the current vehicle speed and the open loop retardation torque is determined based on the indication of the current vehicle speed weighted with a negative vehicle speed weight factor.

In some examples, one of the one or more vehicle state indicator is an indication of the current temperature of a vehicle component. Preferably the vehicle component is a brake component, and the open loop retardation torque is determined based on the indication of the current temperature of the brake component weighted with a positive vehicle brake temperature weight factor.

In some examples, the current vehicle acceleration indicator is an indication of a position of an accelerator of the vehicle.

In one variant, the vehicle comprises one or more retarders and controlling the torque applied by the one or more propulsion sources comprises controlling a torque applied by the one or more retarders.

In one variant, one of the one or more retarders is an electric retarder or a hydraulic retarder.

In one variant, one of the one or more propulsion sources is an electric motor and controlling the torque applied by the electric motor comprises controlling a regenerative torque applied by the electric motor.

In one variant, one of the one or more propulsion sources is a combustion engine and one of the one or more retarders is a compression release brake or an exhaust brake.

In a third aspect, a processor device for control of a resulting retardation torque of a vehicle is presented. The processor device is configured to cause execution of the method of the first aspect.

In some examples, the processor device is further configured to cause closed loop control of the resulting retardation torque of the vehicle. The closed loop control may be caused by obtaining a current resulting retardation torque of the vehicle, and controlling of the resulting retardation torque of the vehicle by one or more propulsion sources of the vehicle based on the open loop retardation torque and the current retardation torque.

In some examples, the processor device is further configured to cause obtainment of a configurable requested retardation torque, and wherein causing control of the resulting retardation torque of the vehicle is further based on the requested retardation torque.

In a fourth aspect, a vehicle is presented. The vehicle comprises at least one propulsion source, at least one driver controlled input, at least one vehicle state sensor and a processor device according to the third aspect. The processor device is operatively connected to the at least one driver controlled input and the at least one vehicle state sensor and configured to cause control of a resulting retardation torque of the vehicle.

In some examples, the vehicle is a heavy-duty vehicle.

In some examples, the vehicle is a car.

In some examples, the vehicle is a nautical vehicle.

In a fifth aspect, a computer program product is presented. The computer program product comprises program code for performing, when executed by a processor device, the method of the first aspect.

In a sixth aspect, a control system is presented. The control system comprises one or more processor devices configured to perform the method according to the first aspect.

In a seventh aspect, a non-transitory computer-readable storage medium is presented. The non-transitory computer-readable storage medium comprises instructions, which when executed by a processor device, cause the processor device to perform the method of the first aspect.

The above aspects, accompanying claims, and/or examples disclosed herein above and later below may be suitably combined with each other as would be apparent to anyone of ordinary skill in the art.

Advantages and additional features are disclosed in the following description, claims, and drawings, and will be readily apparent therefrom to those skilled in the art or recognized by practicing the disclosure as described herein. There are also disclosed herein processor devices, computer readable media, and computer program products associated with the above discussed technical benefits.

BRIEF DESCRIPTION OF THE DRAWINGS

With reference to the appended drawings, below follows a more detailed description of aspects of the disclosure cited as examples. These and other aspects, features and advantages will be apparent and elucidated from the following description of various embodiments; references being made to the appended diagrammatical drawings which illustrate non-limiting examples of how the concept can be reduced into practice.

DETAILED DESCRIPTION

Aspects set forth below represent the necessary information to enable those skilled in the art to practice the disclosure.

Cruise control is a common feature in modern vehicles. This feature controls a speed of the vehicle such that the driver is no longer required to control an accelerator of the vehicle. As is commonly known, cruise control will ensure that the speed of the vehicle is constant regardless of e.g. the inclination of the road etc. As a result, more torque will be applied to a propulsion source of the vehicle when going uphill, and brakes of the vehicle may be applied when going downhill.

Another function, somewhat related to the cruise control, is one pedal drive (OPD). OPD refers to the ability to control vehicle propulsion/braking using only one driver controlled input, generally a pedal and commonly the accelerator, or accelerator pedal, of the vehicle. The speed of the vehicle is controlled by the driver controlled input, meaning controlling the driver controlled input in a first direction (e.g. increase/decrease, press/depress etc.) will increase the speed of the vehicle, and controlling the driver controlled input in a second (opposite) direction will decrease the speed of the vehicle. The difference between having OPD activated and not activated is that, when activated, control of the driver controlled input in the second direction may actively apply a braking force to the vehicle. This is common in e.g. electrical vehicles wherein generally, when OPD is activated, release of the accelerator will control an electrical motor in a regenerative braking mode, effectively slowing down the vehicle. The OPD suffers from the same drawbacks as cruise control, e.g. that more torque will be applied to a propulsion source of the vehicle when going uphill, and brakes (or regenerative braking by an electrical motor) of the vehicle may be applied when going downhill.

The inventors behind the present disclosure have identified these, and other, drawbacks of the prior art. The inventors have, through inventive thinking, concluded that the drawbacks of the prior art may be addressed by the teachings of the present disclosure.

The teachings of the present disclosure are applicable to any vehicle usable with OPD of any sort. The examples and aspect herein are generally presented in reference to a vehicle in the form of a heavy-duty vehicle in the form of a truck. However, other heavy-duty vehicles (e.g. buses, construction equipment etc.) together with light vehicles (e.g. cars, motorcycles, pick-ups etc.), nautical vehicles (e.g. motor boats, ships etc.) may benefit from the teachings herein.

Figure 1:
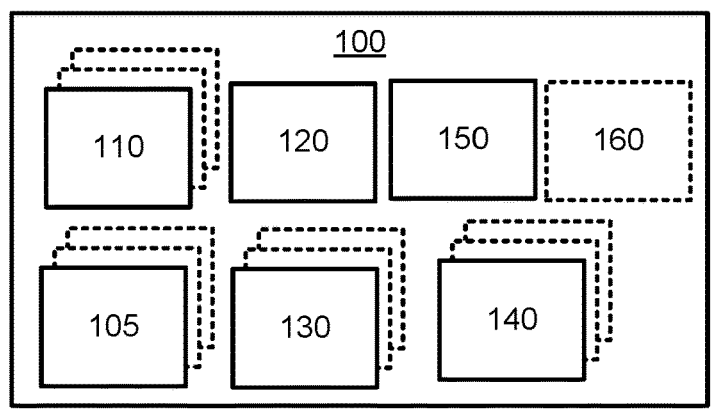
FIG. 1 is an exemplary schematic view of a vehicle according to some examples of the present disclosure.

With reference to FIG. 1, a vehicle 100 according to an aspect of the present disclosure will be presented. The vehicle 100 may be any suitable vehicle as mentioned herein. The vehicle 100 will be referenced to as an exemplary vehicle 100 in the form of a heavy-duty truck 100. This is for explanatory purposes, and the skilled person will understand how to implement the teachings presented herein on other types of vehicles.

The vehicle 100 comprises at least one propulsion source 110. The vehicle 100 may comprise two or more propulsion sources 110 and not all propulsion sources have to be the same kind of propulsion source 110. In a preferred example, the vehicle 100 comprises only one propulsion source 110 in the form of an electrical motor 110. In other examples, the vehicle 100 comprises only one propulsion source 110 in the form of an internal combustion engine 110. In some examples, the vehicle 100 comprises two or more propulsion source 110 in the form of electrical motors 110. In some examples, the vehicle 100 comprises two or more propulsion sources 110 in the form of combustion engines 110. In some examples, the vehicle 100 comprises two or more propulsion sources 110 wherein one or more propulsion sources 110 are in the form of electrical motors 110 and one or more of the propulsion sources are in the form of combustion engines 110. The propulsion source 110 is (directly or indirectly) connected to at least one propelling device 105 of the vehicle 110. The propelling device 105 of a truck 100 may be one or more wheels 105 of the truck 100 and the propelling device of a nautical vehicle 100 may be one or more propellers of the nautical vehicle 100.

The vehicle 100 further comprises at least one driver controlled input 120 configured to (directly or indirectly) control a torque provided by the propulsion source 110 to the propelling device 105. This driver controlled input 120 may be configured to provide a vehicle acceleration indicator 125. In a truck 100, the driver controlled input 120 may be the accelerator 120 and the vehicle acceleration indicator 125 may be an indication of the depression of the accelerator 120. FIG. 1 only shows one driver controlled input 120, but in some examples, the vehicle 100 may comprise further driver controlled inputs 120.

The vehicle 100 further comprises a processor device 150 configured to control a retardation torque of a vehicle 100. The retardation torque, according to the present disclosure, is to mean any torque provided (e.g. transferred, applied etc.) to the propelling device 105 of the vehicle 100. The retardation torque may be provided by any suitable retardation device 130 of the vehicle 100. The retardation devices 130 may be exemplified by, but not limited to, one or more electric machines (e.g. electrical motor 110, etc.), combustion machines (e.g. combustion engine 110, etc.) engine retarder, driveline retarder, brake resistors, hydraulic retarders, compression release brakes, exhaust brakes, service brakes etc.

The vehicle further comprises at least one vehicle state sensor 140. The vehicle state sensor 140 is a sensor configured to obtain (sense, measure or otherwise quire) data relating to a state of the vehicle 100. These states will be further explained below. The data obtained by the vehicle state sensor 140 may be provided in any suitable way and may be provided as a vehicle state indicators 145 (see FIG. 2). In some embodiments, the data obtained by the vehicle state sensor 140 may be processed and/or filtered before being available as one or more vehicle state indicators 145. Consequently, the vehicle state indicators 145 is an indicator configured to indicate a current state of the vehicle 100, or a current state of an environment surrounding the vehicle 100. As mentioned, the one or more vehicle state indicators 145 may be obtained by one or more vehicle state sensors 140. The vehicle state indicator 145 may be in the form of an output from one or more vehicle state sensors 140 configured to obtain the current state of the vehicle 100 and/or its surroundings.

If the vehicle 100 is a land-based vehicle 100, it will generally comprise one or more wheel brakes (not shown) configured to apply retardation torque directly to the wheels 105. For the present disclosure, the retardation torque controlled is retardation torque applied by one or more auxiliary brakes. The auxiliary brakes may be defined as all means of retardation control excluding the wheel brakes. Specifically, the auxiliary brakes are the propulsion source 110 and/or the retarder 130 (if present). In preferred examples, an auxiliary brake is a regenerative retardation torque provided by the electric motor 120.

The vehicle state indicator 145 may be exemplified by, but not limited to, an indication of a current vehicle mass, a current vehicle load, a current vehicle speed, a current vehicle inclination, a current temperature of a vehicle component or a current road friction experienced by the vehicle 100. The vehicle state indicator 145 will be further explained below. Optionally, the vehicle state indicator 145 may be exemplified by, but not limited to, an indication of a predicted vehicle mass, a predicted vehicle load, a predicted vehicle speed, a predicted vehicle inclination, a predicted temperature of a vehicle component, or a predicted road friction experienced by the vehicle 100.

As will be further explained below, the vehicle 100 may comprise an additional driver controlled input 160.

The circuits, devices, features, components, modules etc. presented as being comprised in the vehicle 100 are the ones most important for understanding of the teachings presented herein.

The skilled person will appreciate that any vehicle 100 generally comprise additional components but will have no problem, after digesting the teaching presented herein, to implement the features of the present disclosure in a suitable vehicle 100.

Figure 2:
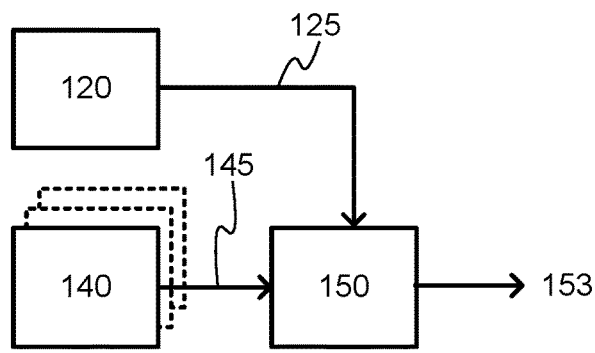
FIG. 2 is an exemplary schematic view of an open loop control function according to some examples of the present disclosure.

FIG. 2 shows a schematic diagram illustrating the connection between the processor device 150 and other components of the vehicle 100. The processor device 150 is preferably operatively connected to the driver controlled input 120. The processor device 150 may be configured to obtain (measure, detect, estimate, be provided with, etc.) the current vehicle acceleration indicator 125 via this operative connection to the driver controlled input 120. To exemplify, the driver controlled input 120 may be the accelerator 120 of a heavy-duty vehicle 100, and the current vehicle acceleration indicator 125 may be an indication of a current depression of the accelerator 120. To exemplify further, the acceleration indicator 125 may be 0% if the accelerator 120 is subject to substantially no (minimum) depression, and 100% if the accelerator 120 is subject to substantially maximum (full) depression.

As seen in FIG. 2, the processor device 150 may be operatively connected to one or more of the vehicle state sensors 140. The processor device 150 may be configured to obtain the vehicle state indicator 145 via this operative connection. The processor device 150 may, in some examples, be configured to process vehicle state indicator(s) 145 (or other data provided by vehicle state sensor(s) 140) from one or more vehicle state sensors 140. The processing of the sensor data and/or vehicle state indicator(s) 145 may provide additional vehicle state indicators 145. To exemplify, by receiving a vehicle state indicator 145 indicating e.g. an ambient temperature, a road temperature, outside air humidity, current rainfall etc., the processing of this may provide a vehicle state indicator 145 indicating an estimation of the current road friction experienced by the vehicle 100.

In a preferred example, the processor device 150 is configured to obtain, or cause obtainment of, the current vehicle accelerator indicator 125 and at least one vehicle state indicator 145. Based on these, the processor device 150 may be configured to determine, or cause determination of, an open loop retardation torque 153. That is to say, the open loop retardation torque 153 may be determined based on the current vehicle accelerator indicator 125 and least one vehicle state indicator 145. As seen in FIG. 2, the open loop retardation torque 153 is determined as an open loop control method, that is to say, the open loop retardation torque 153 is not determined on a current open loop retardation torque 153, or any other retardation torque for that matter.

By determining a torque based on the current vehicle accelerator indicator 125 and least one vehicle state indicator 145, the amount of retardation torque, specifically during OPD, is determined smarter and enables braking of the vehicle in a more energy efficient manner. The combination of the vehicle state indicator 145 (e.g. vehicle speed, mass, road inclination etc.) and the accelerator indicator 125 (e.g. depression of accelerator 120) allows for a smoother drive with less changes in acceleration and/or retardation torque which further increases the energy efficiency of the vehicle.

Figure 3:
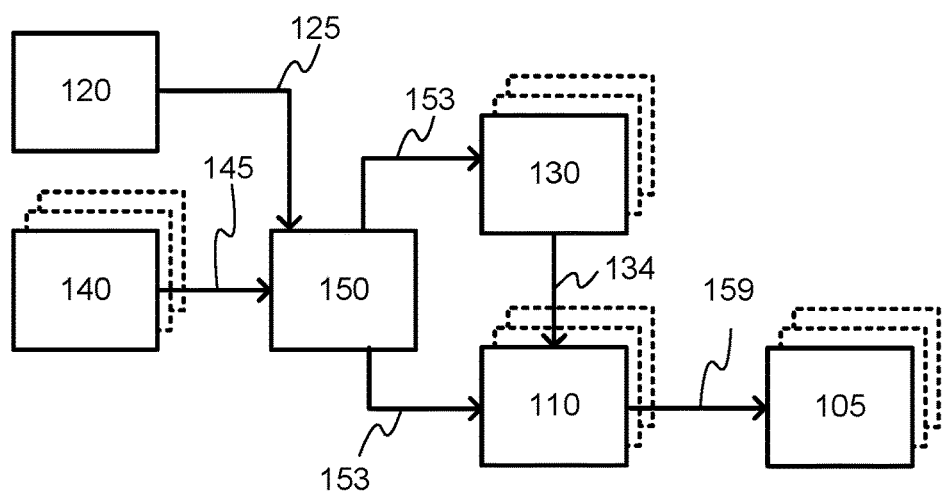
FIG. 3 is an exemplary schematic view of an open loop control function connected to components of a vehicle according to some examples of the present disclosure.

FIG. 3 is a schematic view of the processor unit 150 in connection with further components of the vehicle 100 according to some examples of the present disclosure. As seen in FIG. 3, the processor device 150 may be operatively connected to one or more of the propulsion sources 110 the vehicle 100. The processor device 150 may be operatively connected to, if present, one or more of the retardation devices 130 of the vehicle 100. As previously indicated, the propulsion sources 110 may be utilized as a retardation device 130.

The processor device 150 may be configured to provide the open loop retardation torque 153 to one or more of the propulsion sources 110 such that the torque applied by the propulsion sources 110 is based on the open loop retardation torque 153. A resulting retardation torque 159 will generally be applied by the propulsion sources 110 at the propelling device 105 (e.g. one or more wheels 105 of the vehicle 100). The processor device 150 may be configured to control the resulting retardation torque 159 directly by controlling the torque of the propulsion sources 110 based on the open loop retardation torque 153, e.g. setting the torque to be applied by the propulsion device 110 to the open loop retardation torque 153. However, it may be beneficial for vehicles to comprise separate torque processor device(s) (not shown) in which case the processor device 150 may be configured to cause control of the resulting retardation torque 159 by providing the open loop retardation torque 153 to the torque processor device. In some examples, the processor device 100 is configured to causing the provisioning, by other units or circuits, of the open loop retardation torque 153 to the torque processor device or the propulsion device 110.

In examples wherein the vehicle 100 comprises one or more retardation devices 130, these may be configured to provide a retarder torque 134 to the propulsion source 110 of the vehicle 100 (e.g. apply the retarder torque 134 to the propulsion source 110, subject the propulsion device 110 to the retarder torque 134 etc.). In such examples, the processor device 150 may be configured to control the retarder torque 134, and thereby the resulting retardation torque 159 based on the open loop retardation torque 153. That is to say, the processor device 150 may be configured to control the retarder torque 134 directly by controlling the torque of the retarder 130 device based on the open loop retardation torque 153, e.g. setting the torque to be applied by the retarder device 130 to the open loop retardation torque 153. In examples with separate torque processor device(s), the processor device 150 may be configured to cause control of the resulting retardation torque 159 by providing the open loop retardation torque 153 to the torque processor device and the torque processor device may determine the amount of torque to be provided directly by the propulsion device 110 and how much torque to be applied by the retarder device 130. In some examples, the processor device is configured to determine, or cause determination of, the amount of torque to be provided directly by the propulsion device 110 and how much torque to be applied by the retarder device 130. In some examples, the processor device 100 is configured to causing the provisioning, by other units or circuits, of the open loop retardation torque 153 to the retarder device 130.

Figure 4:
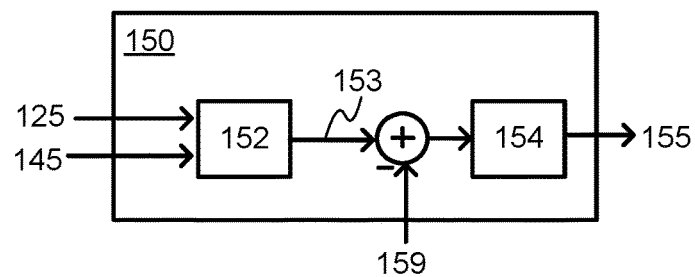
FIG. 4 is a is an exemplary schematic view of a processor unit according to some examples of the present disclosure.

In FIG. 4, an optional example of the processor device 150 is shown. This example comprises an open loop retardation control function 152. The open loop retardation control function 152 may be configured to determine the open loop retardation torque 153 as described with reference to any other aspects or examples of the present disclosure. The processor device 150 of FIG. 4 further comprises a closed loop retardation control function 154 configured to provide a closed loop retardation torque 155 based on the open loop retardation torque 153 and a current resulting retardation torque 159, i.e. the resulting retardation torque 159 currently applied at the propelling device 105. The current resulting retardation torque 159 is preferably (directly or indirectly) sensed, obtained or otherwise acquired by a suitable sensor. However, the current resulting retardation torque 159 may, in some examples, be determined based on e.g. a current energy consumption of the propulsion source 110 etc. The closed loop retardation control function 154 may be implemented as any suitable control loop using one or more of a proportional part, an integer part and/or derivative part in order to provide the closed loop retardation torque 155.

The exemplary division of the processor device 150 into the open loop retardation control function 152 and the closed loop retardation control function 154 is for explanatory purposes and to emphasize that the determination of the open loop retardation torque 153 is an open loop process. It should be mentioned that the processor device 150 may very well be generally configured to provide the open loop retardation torque 153 internally, and based on this and the resulting retardation torque 159, provide the closed loop retardation torque 155 as specified above.

Figure 5:
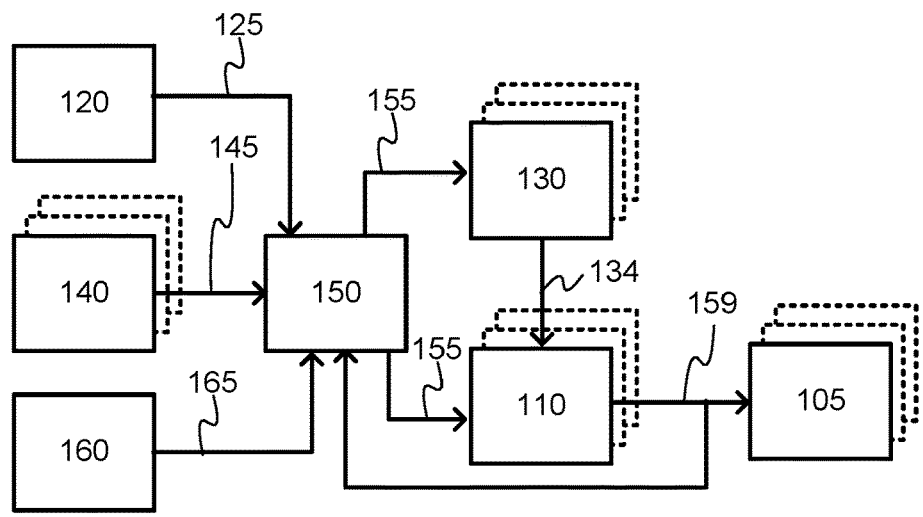
FIG. 5 is an exemplary schematic view of an open loop control function connected to components of a vehicle according to some examples of the present disclosure.

FIG. 5, is a schematic view of the processor unit 150 in connection with further components of the vehicle 100 according to some examples of the present disclosure. The processor unit 150 is preferably the processor unit 150 as presented with reference to FIG. 4 and is configured to provide the closed loop retardation torque 155 to the propulsion device 110 and/or the retarder 130 analogues to how the open loop retardation torque 153 was distributed in FIG. 3. In FIG. 5, one additional optional feature is shown in a configurable requested retardation torque 165 being provided to the processor unit 150. The configurable requested retardation torque 165 may be a torque controllable by a driver of the vehicle using e.g. an additional driver controlled input 160. The additional driver controlled input 160 may be a in the form of a stalk 160 (brake stalk, retarder stalk) of the vehicle. The additional driver controlled input 160 may be controlled discretely or continuously between a plurality of settings indicating a maximum resulting retardation torque 159 to be applied at the propelling device 105.

To exemplify, the configurable requested retardation torque 165 may be an indicator having discrete states exemplified, but not limited, by four states. Assume that a maximum resulting retardation torque 159 achievable at (applied to) the propelling device 105 is a resulting torque at 100%. At a first state, being an off state, no resulting retardation torque 159 should be applied to the propelling device 105, i.e. the vehicle should be free-rolling when the accelerator 120 released. That is to say, the maximum resulting torque allowed is 0%. At a second state, being a low retardation torque state, a comparably low resulting retardation torque 159 should be applied to the propelling device 105, i.e. the vehicle 100 should only be slightly braked when the accelerator 120 released, as compared to having the vehicle at the highest gear and releasing the accelerator 120. That is to say, the maximum resulting retardation torque 159 allowed may for instance not exceed 25%. At a third state, being a medium retardation torque state, a comparably medium high maximum resulting retardation torque 159 should be applied to the propelling device 105, i.e. the vehicle 100 should be noticeably, but not significantly braked when the accelerator 120 released, as compared to having the vehicle at a middle gear and releasing the accelerator 120. That is to say, the maximum resulting retardation torque 159 allowed may for instance not exceed 60%. At a fourth state, being a high retardation torque state, a comparably high maximum resulting retardation torque 159 should be applied to the propelling device 105, i.e. the vehicle 100 should be significantly braked when the accelerator 120 released, as compared to having the vehicle at a low gear and releasing the accelerator 120. That is to say, the maximum resulting retardation torque 159 allowed may for instance not exceed 100%.

As indicated, the requested retardation torque 165 may be utilized to, by e.g. a driver of the vehicle 100, to select the range, a minimum, or a maximum resulting retardation torque 159 that should be applied to the propelling device 105. The requested retardation torque 165 may be obtained by the processor unit 150 and utilized by the closed loop retardation control function 154 to control the closed loop retardation torque 155 about the requested retardation torque 165. It should be mentioned that the closed loop retardation control function 154 may, in this or any other example herein, be implemented in any suitable manner and the skilled person understands, after reading the present disclosure, how to tune and optimize the closed loop retardation control function 154 to provide a suitable closed loop retardation torque 155 based on the open loop retardation torque 153, the requested retardation torque 165 (if present) and the resulting retardation torque 159.

The above is one example, in some examples the requested retardation torque 165 may be controlled by an auxiliary brake functionality of the vehicle 100. The auxiliary brake functionality may be controlled in an exemplary three modes (more or fewer mode may be present), an off mode where no auxiliary brakes are activated, e.g. only the wheel brakes are used when a brake pedal of the vehicle is depressed. An automatic mode which combines a comparably mild OPD with brake blending. In the automatic more, the vehicle 100 may automatically distribute brake power (e.g. retardation torque) between auxiliary brakes of the vehicle and the normal wheel brakes when the brake pedal is depressed. The OPD may be considered mild as the OPD auxiliary brake control (e.g. regenerative retardation torque) may only be active when the accelerator 120 is released, i.e. the open loop retardation torque 153 is set to zero at other situations. In some further examples, the wheel brakes may be added for strong brake requests when the open loop retardation torque 153 (preferably by regeneration) is not capable of fulfilling the drivers brake demand, i.e. the wanted retardation torque 165, or when regeneration is not available (during gear shifts or at comparably low speeds). The third mode of this exemplary wanted retardation torque 165 control may be an on-mode. It the on-mode, the driver controlled input 120, e.g. the accelerator 120, is utilized to control both propulsion and open loop retardation torque 153 (preferably by regenerative braking). The more the accelerator 120 is released the stronger the open loop retardation torque 153.

Releasing the accelerator 120 may provide the highest available auxiliary brake power, i.e. maximum open loop retardation torque 153.

The on-mode exemplified above is a preferred mode of OPD control according to the present disclosure. It should be mentioned that the requested retardation torque 165 is not required for this, and the vehicle 100 may very well be controlled in this manner without the requested retardation control 165 feature.

In a further specific optional example, if e.g. a brake pedal of the vehicle 100 is pressed in whilst the vehicle is operating in OPD, brake blending may be available such that the open loop retardation torque 153 is maximized and any further need of resulting retardation torque 159 may be provided by the wheel brakes. This will ensure that a maximum auxiliary brake torque is applied, i.e. maximum retardation torque is provided by the propulsion source 110 and the retarder 120, before any wheel brakes are actuated.

As will be further explained in the following, the actual brake power, i.e. the resulting retardation torque 159 is preferably situation/state dependent. The resulting retardation torque 159 is preferably influenced by the vehicle state indicators 145. This implies that the resulting retardation torque 159 will be influenced by factors exemplified, but not limited by, vehicle speed, road inclination etc.

In the following, examples of the vehicle state indicators 145 will be given and brief implementation examples and their benefits. It should be noted that, although the teachings herein are applicable with one singular vehicle state indicator 145, it will generally be beneficial to combine a plurality of vehicle state indicators 145 in order to further increase energy efficiency and smoothness (e.g. comfort) of driving the vehicle 100.

Generally, the open loop retardation torque 153 may be determined based on one or more vehicle state indicators 145 weighted together by a respective weight factor. The weight factor may be a positive weight factor or a negative weight factor depending on if the open loop retardation torque 153 is to be increased or decreased due to the vehicle state indicators 145.

The vehicle state indicators 145 exemplified herein are assumed to be positive vehicle state indicators and, where applicable, represented in SI-units. However, the skilled person will appreciate that this is for explanatory purposes and that vehicle state indicators 145 and their respective weight factors may be described in any suitable way, e.g. by a percentage, an n-bit fraction, a fusion of data etc.

In some examples, one of the one or more vehicle state indicators 145 may be an indication of a current vehicle mass, i.e. the mass of the vehicle 100 comprising any load carried by the vehicle 100. Such a vehicle state indicator 145 may be e.g. obtained by one or more vehicle state sensors in the form of load sensors configured to sense (measure, obtain or otherwise determine) a total mass of the vehicle 100 and/or determined based on e.g. tire pressure etc. If the mass of the vehicle 100 is high, it will require greater retardation torque to achieve the same resulting retardation torque 159 compared to if the mass of the vehicle 100 is low.

Consequently, in order to increase energy efficiency and provide similar driving experiences regardless of the mass of the vehicle 100, the open loop retardation torque 153 is preferably increased with the mass of the vehicle 100. A positive mass weight factor is preferably utilized when weighting the vehicle state indicator 145 indicating the mass of the vehicle 100 to provide the open loop retardation torque 153.

In some examples, one or more vehicle state indicators 145 may be an indication of a current vehicle load, i.e. the current mass of the goods carried by the vehicle 100. Such a state indicator 145 may be e.g. obtained by one or more vehicle state sensors 140 in the form of load sensors configured to sense (measure, obtain or otherwise determine) a total load of the vehicle 100 and/or determined based on e.g. changes in tire pressure during loading of the vehicle 100.

If the load of the vehicle 100 is high, it will, as for the mass of the vehicle 100, require greater retardation torque to achieve the same resulting retardation torque 159 compared to if the load of the vehicle 100 is low. Consequently, in order to increase energy efficiency and provide similar driving experiences regardless of the load of the vehicle 100, the open loop retardation torque 153 is preferably increased with the load of the vehicle 100. A positive load weight factor is preferably utilized when weighting the vehicle state indicator 145 indicating the load of the vehicle 100 to provide the open loop retardation torque 153.

In some examples, one or more vehicle state indicators 145 may be an indication of a current vehicle speed. Such a vehicle state indicator 145 may be e.g. obtained by one or more vehicle state sensors 140 in the form of speed sensors of the vehicle 100 configured to sense (measure, obtain or otherwise determine) a current speed of the vehicle 100.

If the speed of the vehicle 100 is high, having a high resulting retardation torque 159 is likely to cause inefficiency in propelling the vehicle 100 as a small decrease in the driver controlled input 120 may cause the vehicle 100 to slow down significantly. Consequently, in order to increase energy efficiency and provide similar driving experiences regardless of the speed of the vehicle 100, the open loop retardation torque 153 is preferably decreased with the speed of the vehicle 100. A negative speed weight factor is preferably utilized when weighting the vehicle state indicator 145 indicating the speed of the vehicle 100 to provide the open loop retardation torque 153.

In some examples, it may be beneficial to disable the OPD, or significantly reduce the open loop retardation torque 153 at speeds below a speed threshold. This is beneficial for instance when travelling slowly in e.g. densely populated areas to allow the vehicle too free-wheel in order to preserve energy. In some examples, the speed threshold is 25 km/h.

In some examples, one or more vehicle state indicators 145 may be an indication of a current vehicle inclination, i.e. of a front to rear inclination of the vehicle 100. This vehicle state indicator 145 may be utilized to determine a current inclination of a road travelled by the vehicle 100. That is to say, the current vehicle inclination may describe a current slope of the road, i.e. it may be determined if the vehicle 100 is currently travelling uphill, downhill or on a flat surface. Such a vehicle state indicator 145 may be e.g. obtained by one or more vehicle state sensors 140 in the form of e.g. an accelerometer or a gyro configured to sense (measure, obtain or otherwise determine) a direction of a ground acceleration vector and therefrom determine a current vehicle inclination.

If the inclination of the vehicle 100 is positive, e.g. when the vehicle 100 is travelling uphill, applying a high resulting retardation torque 159 will cause higher decrease in vehicle speed compared to if the inclination of the vehicle is negative, e.g. when the vehicle is travelling downhill. Consequently, in order to increase energy efficiency and provide similar driving experiences regardless of the inclination of the vehicle 100 (e.g. inclination of a surface traversed by the vehicle 100), the open loop retardation torque 153 is preferably decreased with high (positive) vehicle inclination and increased with low (negative) vehicle inclination. A negative vehicle inclination weight factor is preferably utilized when weighting the vehicle state indicator 145 indicating the inclination of the vehicle 100 to provide the open loop retardation torque 153.

In some examples, one or more vehicle state indicators 145 may be an indication of a current temperature of a vehicle component. Such a vehicle state indicator 145 may be e.g. obtained by one or more vehicle state sensors 140 in the form of temperature sensors 140 of the vehicle 100 configured to sense (measure, obtain or otherwise determine) a current temperature of specific components of the vehicle 100. To exemplify, one or more temperature sensor 140 may be arranged to sense a temperature of the wheel brakes of the vehicle 100, one or more temperature sensors may sensors may be arranged at an outside of the vehicle 100 and configured to sense its own temperature being substantially the same as an ambient temperature etc.

Depending on the vehicle component, the response to the temperature of the vehicle component may differ. In some examples, the vehicle component is a brake component and the indication of the current temperature is an indication of the temperature of the brake component. If the brakes are heated, their efficiency will decrease and continued use of heated brakes may cause brake fatigue and loss of braking power. Therefore, if the brakes are hot, it is beneficial to increase the open loop retardation torque 153 to compensate for any loss in braking power from the braking component and/or provide relief of the braking component allowing it to cool off. Consequently, in order to increase energy efficiency, ensure function of brakes and provide similar driving experiences regardless of the temperature of the brake component, the open loop retardation torque 153 is preferably increased with the temperature of the brake component. A positive vehicle brake temperature weight factor is preferably utilized when weighting the vehicle state indicator 145 indicating the temperature of the vehicle component in the form of a brake component to provide the open loop retardation torque 153.

In some examples, one or more vehicle state indicators 145 may be an indication of a current road friction experienced by the vehicle 100. Such a vehicle state indicator 145 may be e.g. obtained by one or more vehicle state sensors 140 in the form of traction sensors of the vehicle 100 configured to sense (measure, obtain or otherwise determine) a current road friction of the vehicle 100. As previously indicated, the road friction may be estimated by fusion of data provided by multiple vehicle state sensors 140.

If the road friction is low, applying a high resulting retardation torque 159 will increase a risk of the vehicle 100 loosing grip compared to using a low resulting retardation torque 159. Consequently, in order to increase energy efficiency, and avoid loss of grip, the open loop retardation torque 153 is preferably increased with the current road friction. That is to say, if the road friction is low (e.g. an icy road), the open loop retardation torque 153 may be set to zero (i.e. the vehicle 100 is in free-wheel). A positive road friction weight factor is preferably utilized when weighting the vehicle state indicator 145 indicating the road friction experienced by the vehicle 100 to provide the open loop retardation torque 153.

In some examples, one or more vehicle state indicators 145 may be an indication of a current steering angle of the vehicle 100. Such a vehicle state indicator 145 may be e.g. obtained by one or more vehicle state sensors 140 in the form of steering wheel sensor, rudder sensor, yaw sensor, or other suitable sensor configured to sense a current deviation of the vehicle 100 from a straight line, i.e. how much the vehicle 100 is turning.

If the vehicle 100 is turning, a higher resulting retardation torque 159 will provide increased control and increased handling during the turn compared to if the vehicle 100 would be free-wheeling when handling the turn. Consequently, in order to increase energy efficiency and maneuverability, the open loop retardation torque 153 is preferably increased with the current steering angle. A positive steering angle weight factor is preferably utilized when weighting the vehicle state indicator 145 indicating the steering angle of vehicle 100 to provide the open loop retardation torque 153.

The above exemplified vehicle state indicators 145 are not to be considered exhaustive but are provided as way of example of how what to consider when implementing the teaching of the present disclosure based on different vehicle state indicators 145.

In some examples, the vehicle state indicators 145 are indications of e.g. a distance to a vehicle in front (or behind) of the vehicle 100. Such distances may be detected by vehicle state sensors 140 such as radar, LIDAR etc. Based on the previous examples, corresponding weight factors would preferably be weight fractions in this example such that the open loop retardation torque 153 is increased as the distance to a forward vehicle decreases. Correspondingly, for safety reasons, the open loop retardation torque 153 may be decreased as the distance to a rear vehicle decreases.

In some examples, the vehicle state indicators 145 may be indications of traffic or road situations. These may be exemplified by, but not limited to, upcoming roundabouts, road crossings, congestions, road curvature etc. Such vehicle state indicators 145 may be detected by e.g. processing video images cameras mounted on the vehicle 100, by retrieval of map or traffic data from remote server etc.

It should be mentioned that when multiple vehicle state indicators 145 are used, the weight factors associated with respective vehicle state indicators 145 are preferable weighted in relation to each other, e.g. if the road friction is comparably low and there is a negative inclination of the vehicle 100, substantially no resulting retardation torque 159 would be preferred as there is a risk of the vehicle 100 losing its grip.

It should further be emphasized that the open loop retardation torque 153 may very well be set to zero, i.e. in a free-wheeling mode which is the most energy efficient and may be preferred when releasing the accelerator 120 when going uphill or travelling at high speeds on the free-way.

Figure 6:
FIG. 6 is a schematic view of a method of open loop control of a retardation torque according to some examples of the present disclosure.

Based on the teaching presented herein, and with reference to FIG. 6, a method 200 of open loop control of a retardation torque of a vehicle 100 will be exemplified. The method 200 may be executed by any suitable processing or control device. Preferably, the processor device 150 is configured to cause execution of the method 200.

The method 200 comprises obtaining 210 (acquiring, receiving, determining, etc.) of the current vehicle acceleration indicator 125. This may be accomplished according to any suitable example or aspect presented herein. Preferably, the current vehicle acceleration indicator 125 is obtained from the driver controlled input 120, and more preferably from the driver controlled input 120 in the form of an accelerator 120.

The method 200 further comprises obtaining 220 one or more current vehicle state indicators 145. The one or more current vehicle state indicators 145 may be obtained (acquired, received, determined, etc.) according to any example or aspect as presented herein.

Preferably, the one or more current vehicle state indicators are obtained from one or more vehicle state sensors 140 according to the teachings presented herein. The vehicle state indicator 145 may be any vehicle state indicator 145 as presented herein, or any combinations of the vehicle state indicators 145 as presented herein.

The method 200 further comprises determining 230 the open loop retardation torque 153. The open loop retardation torque 153 may be determined according to any example or aspect of the present disclosure. Preferably, the open loop retardation torque 153 is determined based on the vehicle acceleration indicator 125 and one or more of the vehicle state indicators 145.

The determination may comprise weighting the one or more vehicle state indicators 145 and/or processing the one or more vehicle state indicators 145 in order to determine the open loop retardation torque 153.

Optionally, the method 200 may further comprise controlling 240 the resulting retardation torque 159 based on the open loop retardation torque 153. This control may be accomplished in according to any aspect or example as presented herein, but is preferably provided by controlling a torque applied by one or more of the propulsion sources 110 of the vehicle 100, i.e. controlling one or more auxiliary brakes of the vehicle 100.

In a preferred example of the method 200, control 240 of the resulting retardation torque 159 is performed by controlling a regenerative torque provided by a propulsion source 110 in the form of an electrical motor 110.

For efficiency of disclosure, the method 200 being only briefly explained, it should be mentioned that it may be expanded to comprise any feature, example, aspect or solution presented herein.

Figure 7:
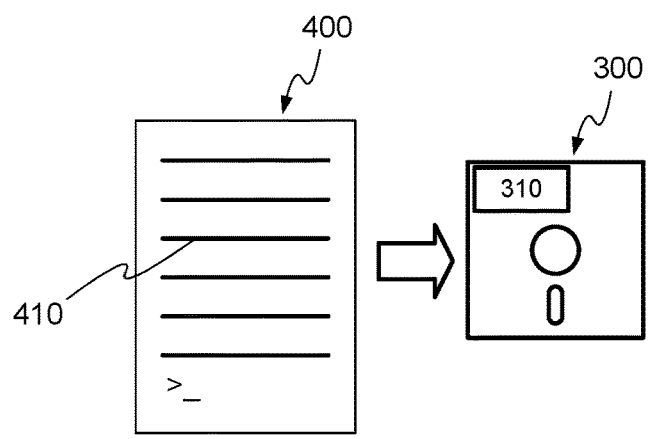
FIG. 7 is a schematic view of a computer program product according to some examples of the present disclosure.

The method 200 may, as previously indicated, be performed by the processor device 150 as presented herein. In FIG. 7, a computer program product 300 is shown in a schematic view. The computer program product 300 may comprise a computer program 400 and a computer-readable storage medium 310 (illustrated by a vintage 5,25" floppy drive). The computer readable storage medium 310 is preferably a non-transitory computer readable storage medium 310. The computer program 400 comprises program code 410 (e.g. program instructions 410 or instructions 410) configured to cause a data processing unit, preferably the processor device 150 as presented herein, when executing the program code 410, to perform the method 200 as presented herein with reference to FIG. 6. To this end, the computer program 400 is loadable into the general processor device and configured to cause execution of the method 200 as presented with reference to FIG. 6 when the computer program 400 is run by the data processing unit.

Figure 8:
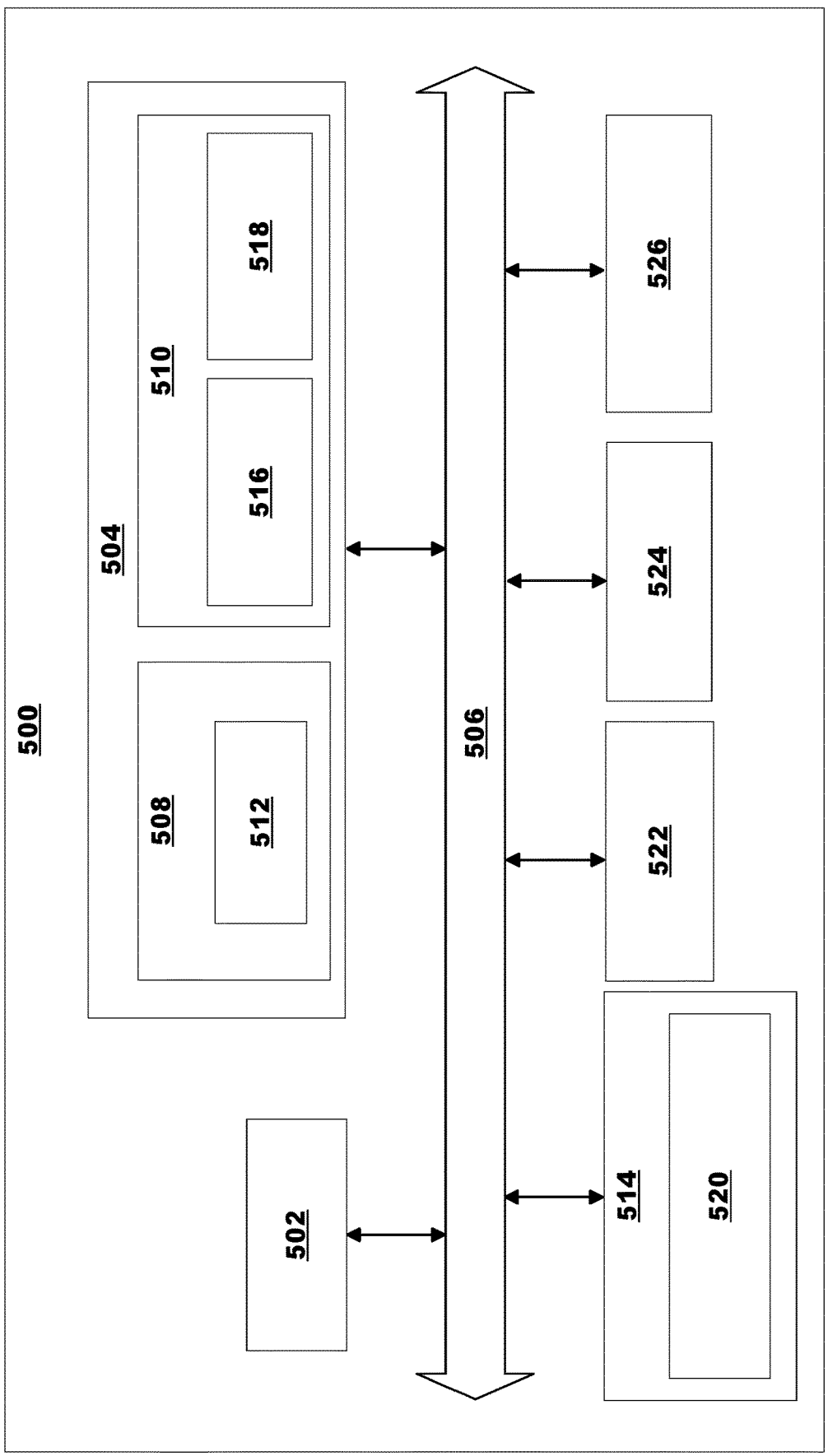
FIG. 8 is a schematic diagram of an exemplary computer system according to some examples of the present disclosure for implementing examples disclosed herein.

FIG. 8 is a schematic diagram of a computer system 500 for implementing examples disclosed herein. The computer system 500 is adapted to execute instructions from a computer-readable medium to perform these and/or any of the functions or processing described herein. The computer system 500 may be connected (e.g., networked) to other machines in a LAN, an intranet, an extranet, or the Internet. While only a single device is illustrated, the computer system 500 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 500 may comprise at least one computing device or electronic device capable of including firmware, hardware, and/or executing software instructions to implement the functionality described herein. The computer system 500 may include a processor device 502 (may also be referred to as a control unit), a memory 504, and a system bus 506. The processor device 502 in FIG. 8 may be the processor device 150 presented elsewhere in the present disclosure. The computer system 500 may include at least one computing device having the processor device 502. The system bus 506 provides an interface for system components including, but not limited to, the memory 504 and the processor device 502. The processor device 502 may include any number of hardware components for conducting data or signal processing or for executing computer code stored in memory 504.

The processor device 502 (e.g., control unit) may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processor device may further include computer executable code that controls operation of the programmable device.

The system bus 506 may be any of several types of bus structures that may further interconnect to a memory bus (with or without a memory controller), a peripheral bus, and/or a local bus using any of a variety of bus architectures. The memory 504 may be one or more devices for storing data and/or computer code for completing or facilitating methods described herein. The memory 504 may include database components, object code components, script components, or other types of information structure for supporting the various activities herein. Any distributed or local memory device may be utilized with the systems and methods of this description. The memory 504 may be communicably connected to the processor device 502 (e.g., via a circuit or any other wired, wireless, or network connection) and may include computer code for executing one or more processes described herein. The memory 504 may include non-volatile memory 508 (e.g., read-only memory (ROM), erasable programmable read-only memory (EPROM), electrically erasable programmable read-only memory (EEPROM), etc.), and volatile memory 510 (e.g., random-access memory (RAM)), or any other medium which can be used to carry or store desired program code in the form of machine-executable instructions or data structures and which can be accessed by a computer or other machine with a processor device 502. A basic input/output system (BIOS) 512 may be stored in the non-volatile memory 508 and can include the basic routines that help to transfer information between elements within the computer system 500.

The computer system 500 may further include or be coupled to a non-transitory computer-readable storage medium such as the storage device 514, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 514 in FIG. 8 may be the computer-readable storage medium 310 presented with reference to FIG. 7. The storage device 514 and other drives associated with computer-readable media and computer-usable media may provide non-volatile storage of data, data structures, computer-executable instructions, and the like.

A number of modules may be implemented as software and/or hard-coded in circuitry to implement the functionality described herein in whole or in part. The modules may be stored in the storage device 514 and/or in the volatile memory 510, which may include an operating system 516 and/or one or more program modules 518. All or a portion of the examples disclosed herein may be implemented as a computer program product 520 (e.g. the computer program product 300 of FIG. 7) stored on a transitory or non-transitory computer-usable or computer-readable storage medium (e.g., single medium or multiple media), such as the storage device 514, which includes complex programming instructions (e.g., complex computer-readable program code) to cause the processor device 502 to carry out the steps described herein. Thus, the computer-readable program code (e.g. program instructions 410 of FIG. 7) may comprise software instructions for implementing the functionality of the examples described herein when executed by the processor device 502. The processor device 502 may serve as a controller or control system for the computer system 500 that is to implement the functionality described herein.

The computer system 500 also may include an input device interface 522 (e.g., input device interface and/or output device interface). The input device interface 522 may be configured to receive input and selections to be communicated to the computer system 500 when executing instructions, such as from a keyboard, mouse, touch-sensitive surface, etc. Such input devices may be connected to the processor device 502 through the input device interface 522 coupled to the system bus 506 but can be connected through other interfaces such as a parallel port, an Institute of Electrical and Electronic Engineers (IEEE) 1394 serial port, a Universal Serial Bus (USB) port, an IR interface, and the like. The computer system 500 may include an output device interface 524 configured to forward output, such as to a display, a video display unit (e.g., a liquid crystal display (LCD) or a cathode ray tube (CRT)). The computer system 500 may also include a communications interface 526 suitable for communicating with a network as appropriate or desired.

The operational steps described in any of the exemplary aspects herein are described to provide examples and discussion. The steps may be performed by hardware components, may be embodied in machine-executable instructions to cause a processor to perform the steps, or may be performed by a combination of hardware and software. Although a specific order of method steps may be shown or described, the order of the steps may differ. In addition, two or more steps may be performed concurrently or with partial concurrence.

The teachings presented herein improves, to some degree, the driving experience and safety of a driver of a vehicle utilizing the teachings herein. The teachings allow the driver to keep his foot in one place for a longer period of time compared to the prior art. This is less work for drivers than moving their foot between two pedals or other driver controlled input. The retardation torque control of the present disclosure provides a more relaxed and safe way to drive compared to the prior art. To exemplify, the stopping phase of the vehicle will generally feel more smoothly when the teachings herein are utilized compared to e.g. applying service brake system, this is due to the teachings of the present disclosure enables smoother transition between propulsion and braking compared to the prior art.

Further to this, the teachings herein allows for improved controllability of the braking torque. The braking torque is integrated in the driver controlled input (the accelerator) and the driver is not require to alter or switch controlling different OPD modes.

The open loop control of the retardation torque as presented herein allows for a decrease in energy required to propel a vehicle implementing these teachings. That is to say, a maximum driving range of an electrical vehicle may be extended and the fuel consumption of a combustion engine vehicle may be decreased. The driver is assisted in using an energy efficient means of controlling the vehicle and the use of e.g. a brake pedal will be minimized. This reduces wear and tear of the service brakes of the vehicle, saving cost in spare part, reducing waste, increasing uptime of vehicle etc. Further to this, a risk that the brakes will overheat and not function properly when required, e.g. in an emergency, is reduced.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

The invention claimed is:

1. A computer-implemented method of open loop control of a retardation torque of a vehicle, the method comprising:
  obtaining, by a processor device of a computer system, a current vehicle acceleration indicator,
  obtaining, by a processor device of a computer system, one or more current vehicle state indicators,
  determining, by a processor device of a computer system, an open loop retardation torque based on the vehicle acceleration indicator and the one or more vehicle state indicators, and
  controlling, by a processor device of a computer system, a resulting retardation torque applied by one or more propulsion sources of the vehicle based on the open loop retardation torque.

2. The method of claim 1, wherein one of the one or more vehicle state indicators is an indication of a current vehicle mass, a current vehicle load, a current vehicle speed, a current vehicle inclination, a current temperature of a vehicle component or a current road friction experienced by the vehicle.

3. The method of claim 1, wherein one of the one or more vehicle state indicator is an indication of the current vehicle mass and the open loop retardation torque is determined based on the indication of the current vehicle mass weighted with a positive mass weight factor.

4. The method of claim 1, wherein one of the one or more vehicle state indicator is an indication of the current vehicle load and the open loop retardation torque is determined based on the indication of the current vehicle load weighted with a positive load weight factor.

5. The method of claim 1, wherein one of the one or more vehicle state indicator is an indication of the current vehicle inclination and the open loop retardation torque is determined based on the indication of the current vehicle inclination weighted with a negative vehicle inclination weight factor.

6. The method of claim 1, wherein one of the one or more vehicle state indicator is the indication of the current vehicle speed and causing determining of the open loop retardation torque is based on the indication of the current vehicle speed weighted with a negative vehicle speed weight factor.

7. The method of claim 1, wherein one of the one or more vehicle state indicator is an indication of the current temperature of a vehicle component, the vehicle component being a brake component, and determining the open loop retardation torque is determined based on the indication of the current temperature of the brake component weighted with a positive vehicle brake temperature weight factor.

8. The method of claim 1, wherein the current vehicle acceleration indicator is an indication of a position of an accelerator of the vehicle.

9. The method of claim 1, wherein the vehicle comprises one or more retarders and controlling the torque applied by the one or more propulsion sources comprises controlling a torque applied by the one or more retarders.

10. The method of claim 9, wherein one of the one or more retarders is an electric retarder or a hydraulic retarder.

11. The method of claim 1, wherein one of the one or more propulsion sources is an electric motor and controlling the torque applied by the electric motor comprises controlling a regenerative torque applied by the electric motor.

12. The method of claim 1, wherein one of the one or more propulsion sources is a combustion engine and one of the one or more retarders is a compression release brake or an exhaust brake.

13. A computer system comprising a processor device configured to perform the method of claim 1.

14. A processor device for control of a resulting retardation torque of a vehicle, wherein in the processor device is configured to cause execution of the method of claim 1.

15. The processor device of claim 14, further configured to cause closed loop control of the resulting retardation torque of the vehicle by causing:
obtainment of a currently applied resulting retardation torque of the vehicle, and
control of the resulting retardation torque of the vehicle by one or more propulsion sources of the vehicle based on the open loop retardation torque and the currently applied resulting retardation torque.

16. The processor device of claim 15, further configured to cause:
obtainment of a configurable wanted retardation torque, wherein causing control of the resulting retardation torque of the vehicle is further based on the requested retardation torque.

17. A vehicle comprising at least one propulsion source, at least one driver controlled input, at least one vehicle state sensor and a processor device according to claim 14, wherein the processor device is operatively connected to the at least one driver controlled input and the at least one vehicle state sensor and configured to cause control of a resulting retardation torque of the vehicle.

18. A computer program product comprising program code for performing, when executed by a processor device, the method of claim 1.

19. A control system comprising one or more processor devices configured to perform the method according to claim 1.

20. A non-transitory computer-readable storage medium comprising instructions, which when executed by a processor device, cause the processor device to perform the method of claim 1.

* * * * *